US011949162B2

(12) United States Patent
Buckley et al.

(10) Patent No.: US 11,949,162 B2
(45) Date of Patent: Apr. 2, 2024

(54) INTEGRATED HIGHER ORDER FLOQUET MODE MEANDER LINE POLARIZER RADOME

(71) Applicants: Michael J. Buckley, Boyds, MD (US); Channasandra Ravishankar, Clarksburg, MD (US)

(72) Inventors: Michael J. Buckley, Boyds, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 144 days.

(21) Appl. No.: 17/183,028

(22) Filed: Feb. 23, 2021

(65) Prior Publication Data

US 2021/0265737 A1 Aug. 26, 2021

Related U.S. Application Data

(60) Provisional application No. 62/981,493, filed on Feb. 25, 2020.

(51) Int. Cl.
*H01Q 15/24* (2006.01)
*H01Q 1/42* (2006.01)

(52) U.S. Cl.
CPC ............... *H01Q 15/24* (2013.01); *H01Q 1/42* (2013.01); *H01Q 1/422* (2013.01)

(58) Field of Classification Search
CPC ........... H01Q 15/24; H01Q 1/42; H01Q 1/422
See application file for complete search history.

(56) References Cited

U.S. PATENT DOCUMENTS

| | | | | |
|---|---|---|---|---|
| 10,283,876 | B1 * | 5/2019 | Livadaru | H01Q 15/0086 |
| 2016/0156108 | A1 * | 6/2016 | Thomas | H01Q 15/244 343/909 |
| 2016/0233578 | A1 * | 8/2016 | Kume | B29C 70/34 |
| 2020/0028278 | A1 * | 1/2020 | Tomasic | H01Q 15/244 |
| 2021/0194116 | A1 * | 6/2021 | Gorman | H01Q 1/42 |

FOREIGN PATENT DOCUMENTS

| | | | | |
|---|---|---|---|---|
| CN | 108767491 | A * | 11/2018 | H01Q 15/244 |
| CN | 108767491 | A | 11/2018 | |

OTHER PUBLICATIONS

International Search Report for corresponding PCT Application No. PCT/US2021/019263.

* cited by examiner

*Primary Examiner* — Hoang V Nguyen
*Assistant Examiner* — Yonchan J Kim
(74) *Attorney, Agent, or Firm* — Capitol City TechLaw; Jasbir Singh

(57) ABSTRACT

An integrated HOFS meander line polarizer radome including: a substrate including layers having a dielectric constant (dk) greater than 2.0 and less than 5.0; a Higher Order Floquet-mode Structure (HOFS) may include HOFS lines disposed in a first subset of the layers; and meander lines, to provide a phase shift and match, disposed in a second subset of the layers, where at least one layer of the first subset is disposed between the second subset of the layers.

18 Claims, 6 Drawing Sheets

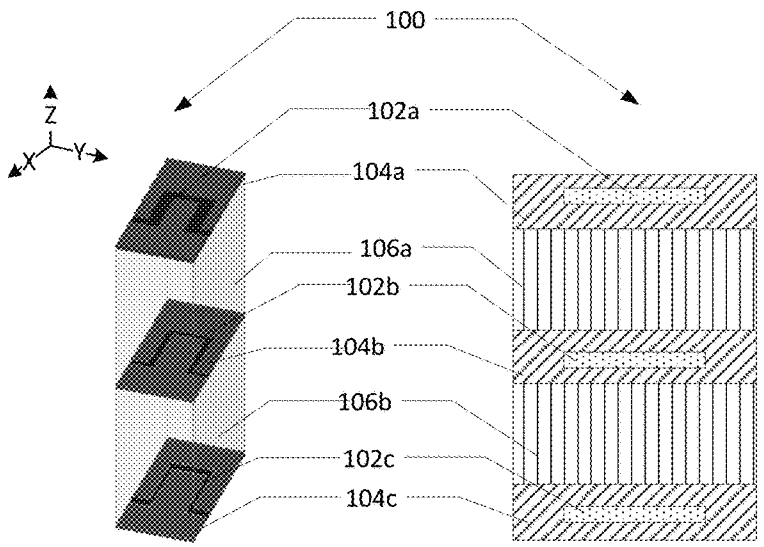
FIG. 1A (Prior Art)
FIG. 1B (Prior Art)
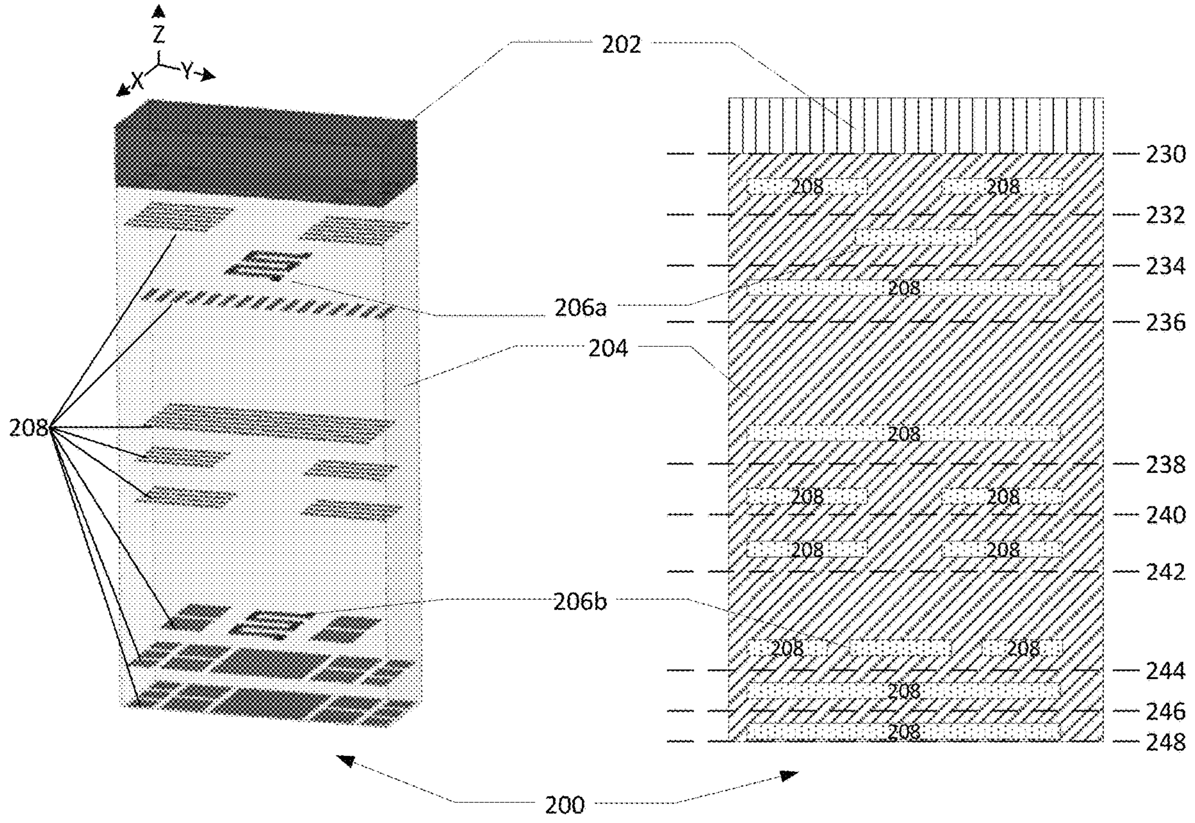
FIG. 2A
FIG. 2B

INTEGRATED HIGHER ORDER FLOQUET MODE MEANDER LINE POLARIZER RADOME

CROSS-REFERENCE TO RELATED APPLICATIONS AND INCORPORATION BY REFERENCE

The present application claims the benefit under 35 U.S.C. 119(e) of U.S. Provisional Application Ser. No. 62/981,493, filed Feb. 25, 2020, which is incorporated herein by reference in its entirety.

FIELD

The present teachings are directed generally toward antennas, and more particularly to electronically scanned antennas. An integrated higher order Floquet mode meander line polarizer radome is disclosed.

BACKGROUND

Prior art meander line polarizer technology cannot provide a polarizer with an integrated meander line polarizer and radome, where the meander line has a low axial ratio and insertion loss over a relatively wide frequency band and scan volume. In the prior art, the radome and meander line polarizer are designed as separate distinct parts resulting in unacceptable system performance that is significantly worse than the integrated meander line polarizer and radome of the present teachings.

There are three standard standalone types of radomes: Half-wave wall radome, C sandwich radome, and Thin Walled radome. None of the standard standalone radomes work in a meander line polarizer radome system. Each of the standalone radomes fails to meet at least one of the meander line polarizer radome system requirements: insertion loss, axial ratio, and/or environmental protection.

FIG. 1A is a perspective view of a standalone meander line polarizer of the prior art.

FIG. 1B is a cross-sectional view of a standalone meander line polarizer of the prior art.

Figure 3A:
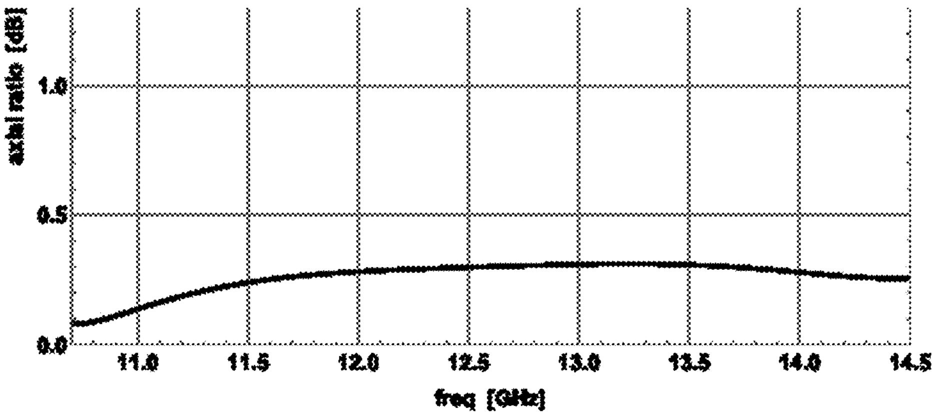

A Standalone meander line polarizer 100 includes a first substrate 104*a*, 104*b*, 104*c* and a second substrate 106*a*, 106*b*. Each of the first substrates includes a metal line 102*a*, 102*b*, 102*c* respectively. The first substrate is a Dupont substrate having a dk of 3.4. The second substrate is a foam having a dk of 1.1 and a loss tan of 0.016. The first substrate 104*a*, the second substrate 106*a*, the first substrate 104*b*, the second substrate 106*b* and the first substrate 104*c* are stacked, in that order, to form the Standalone meander line polarizer 100 such that the metal line 102*a*, metal line 102*b* and metal line 102*c* are aligned on a Z-axis. The stacking of the first substrates 104*a*, 104*b*, 104*c* and the second substrates 106*a*, 106*b* is along the Z-axis.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings are directed to an integrated higher order Floquet mode meander line polarizer radome to provide improved bandwidth, insertion loss, axial ratio, and scan volume. The polarizer radome may use HOFS materials for bandwidth, scan, insertion loss, and axial ratio performance. The polarizer radome may use Rogers 5880 or Panasonic Megtron 6 instead of foam materials for ease of manufacturing. The radome may provide robust environmental protection. The integrated higher order Floquet mode polarizer radome may be used in ground terminals as part of a Low Earth Orbit (LEO) and Middle Earth Orbit (MEO) satellite systems, or a Geosynchronous Earth Orbit (GEO) satellite systems with moving user terminals.

One general aspect includes a polarizer radome including: a substrate including layers having a dielectric constant (dk) greater than 2.0 and less than 5.0; a higher order Floquet mode Structure (HOFS) may include HOFS lines disposed in a first subset of the layers; and meander lines, to provide a phase shift and match, disposed in a second subset of the layers, where at least one layer of the first subset is disposed between the second subset of the layers.

Implementations may include one or more of the following features. The polarizer radome where at least one layer of the first subset is disposed above the second subset. The polarizer radome where at least one layer of the first subset is disposed below the second subset. The polarizer radome where at least one layer of the first subset is one of the layers of the second subset. The polarizer radome where each of the meander lines includes an electrical conductor having a width greater than or equal to 4 mils. The polarizer radome where each of the meander lines is shaped as a rectangular wave and the meander lines are stacked above each other. The HOFS lines may include an electrical conductor having a width greater than or equal to 4 mils. The layers may include at least nine (9) layers. In some embodiments, the substrate has a cross-section depth between 150 and 450 mils. In some embodiments, the radiating element includes a radome where there is no gap between the substrate and the radome. The radome may include quartz having a thickness of at least 30 mils. The radiating element may include an adhesive disposed between a surface of the radome and a surface of the substrate. The substrate and the radome together may have a cross-section depth between 180 and 480 mils. The dielectric constant of the radome is between 2. and 5.

Is some embodiments, at least one layer of the first subset is disposed above the second subset, at least one layer of the first subset is disposed below the second subset, at least one layer of the first subset is one of the layers of the second subset, the layers may include at least nine (9) layers, the substrate has cross-section dimensions between 100 and 400 mils, each of the meander lines may include an electrical conductor having a width greater than or equal to 4 mils, each of the meander lines is shaped as a rectangular wave, and the meander lines are stacked above each other. The polarizer may be integrated with a radome.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 1A is a perspective view of a standalone meander line polarizer of the prior art.

FIG. 1B is a cross-sectional view of a standalone meander line polarizer of the prior art.

FIG. 2A is a perspective view of an integrated higher order Floquet mode meander line polarizer radome including higher order Floquet mode layers integrated with a meander line polarizer and radome according to various embodiments.

FIG. 2B is a cross-sectional of an integrated higher order Floquet mode meander line polarizer radome including higher order Floquet mode layers integrated with a meander line polarizer and radome according to various embodiments.

FIG. 3A-3E show graphical representations of the performance of an integrated higher order Floquet mode meander line polarizer radome according to various embodiments.

FIG. 4A-4E show graphical representations of the performance of an integrated higher order Floquet mode meander line polarizer radome according to various embodiments.

FIG. 5A-5E show graphical representations of the performance of an integrated higher order Floquet mode meander line polarizer radome according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms “a,” “an” and “the” are intended to include the plural forms as well, unless the context clearly indicates otherwise. Furthermore, the use of the terms “a,” “an,” etc. does not denote a limitation of quantity but rather denotes the presence of at least one of the referenced items. The use of the terms “first,” “second,” and the like does not imply any order, but they are included to either identify individual elements or to distinguish one element from another. It will be further understood that the terms “comprises” and/or “comprising”, or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings are directed to an integrated higher order Floquet mode meander line polarizer radome to provide improved bandwidth, insertion loss, axial ratio, and scan volume. In some embodiments, the apparatus operates across a frequency range 10.7 GHz-14.5 GHz. In some embodiments, the apparatus operates across a wide half conical scan angle spanning 0-50 degrees. In some embodiments, the apparatus operates with an Axial Ratio<2.0 dB. In some embodiments, an Insertion Loss<−0.55 dB to 45 degrees and <−0.6 to 50 degrees. In other embodiments, the apparatus includes an integrated Radome, for example, a 30-mil quartz radome integrated with the meander line polarizer. The meander line polarizer may be disposed in an environmentally robust material having a high dielectric constant (dk). In some embodiments, the apparatus may have a Total stack height, including radome, of about 290 mils.

A low-profile antenna system that includes an integrated higher order Floquet mode meander line polarizer radome is desirable in many applications including aero and ground applications. An integrated radome for an integrated higher order Floquet mode meander line polarizer radome permits a low-profile deployment and reduces air drag induced by the airborne antenna. Moreover, low profile antennas systems are important for packaging and other deployments. The integrated higher order Floquet mode meander line polarizer radome may be used in antenna systems that operate in a wide frequency range with large scan volume requirements such as satellite systems like the Low-Earth Orbit or Mid-Earth Orbit satellite systems. The low-profile integrated higher order Floquet mode meander line polarizer radome may be used for vehicular and aeronautical applications in Low-Earth Orbit, Mid-Earth Orbit, Geosynchronous Earth Orbit, High Altitude Platform satellite systems.

For a frequency range that spans 10.7 to 14.5 GHz and a scan volume spanning 0-50 degrees, the insertion loss for a separate radome severely affects antenna system performance. An insertion loss requirement of −0.25 dB reflects the problem that insertion loss must be allocated between the meander line polarizer and the separate radome. Generally, a −0.3 dB of insertion loss is allocated to the separate meander line polarizer. In the integrated meander line polarizer radome of the present teachings, the entire −0.55 dB of insertion loss is allocated to the integrated radome and meander line polarizer. The reflection from the radome in the integrated radome meander line polarizer may be used to match the reflection from the radome. Since the radome and meander line polarizer are touching or in-contact, transmission line effects are reduced or eliminated. Otherwise, transmission line effects are significant over this scan and frequency volume.

Similarly, for a frequency range that spans 10.7 to 14.5 GHz and a scan volume spanning 0-50 degrees, a meander line polarizer insertion loss value for a separate meander line polarizer is too high. As the separate meander line polarizer is a space fed radiating element scanning to 50 degrees over a 10.7-14.5 frequency band, a separate meander line polarizer will have greater than −11.75 dB return loss.

FIG. 2A is a perspective view of a integrated higher order Floquet mode meander line polarizer radome according to various embodiments.

FIG. 2B is a cross-sectional view of a integrated higher order Floquet mode meander line polarizer radome according to various embodiments.

An integrated higher order Floquet mode meander line polarizer radome 200 may include a radome 202 and a substrate 204. The radome 202 may be an integrated radome. The radome 202 may include a high dielectric coefficient environmentally robust material, for example, quartz. In some embodiments, the dielectric coefficient (dk) of the radome may be between 2.0 and 5.0, for example, 3.23. The radome may have a loss tan of 0.016 or the like. The radome 202 may be affixed to the substrate 204 using an adhesive (not shown). The radome 202 may be treated as a layer 230 of the HOFS meander line polarizer 200. The radome 202 may have a depth, illustrated as the Z direction, in FIG. 2. The depth of the radome 202 may be at least 30 mil. A mil is a thousandth of an inch; one mil equals 0.0254 millimeters.

The substrate 204 may include an integrated higher order Floquet-mode structure (HOFS) and a meander line polarizer. The substrate 204 may include layers 232, 234, 236, 238, 240, 242, 244, 246, 248. The layers 232, 234, 236, 238, 240, 242, 244, 246, 248 of the substrate 204 may be virtual. The HOFS may include HOFS lines 208 disposed through a first subset of the layers, namely, layers 232, 236, 238, 240, 242, 244, 246, 248. The meander line polarizer may include meander lines 206*a*, 206*b* disposed in the substrate 204 in a second subset of layers, namely, layer 234 for the meander line 206*a* and layer 244 for the meander line 206*b*.

In some embodiments, a meander line and an HOFS line may share a layer, for example, layer 244 includes some HOFS lines 208 and the meander line 206*b*. As such, layer 244 is part of both the first subset of layers and the second subset of layers. Exemplary layer 244 is such a shared layer.

The meander lines may be metal or electrical conductor. The meander lines may have a width of 4 mil or greater. The meander lines may be shaped as a rectangular wave. The rectangular wave may be disposed in a Z-plane. The rectangular wave may have openings parallel with the X-axis. A meander line may be disposed between HOFS lines in the same layer, for example, meander line 206*a*. Two or more meander lines are stacked above each other or disposed one above the other along the Z-axis may to jointly form a meander line polarizer that provides phase shift and match.

The HOFS lines may be metal. The HOFS lines may have a width of 4 mil or greater. The substrate 204 may include a material having a dielectric constant greater than 2, for example, between 2.0 and 5.0, about 2.2; though a person of ordinary skill in the art having the benefit of the disclosure may appreciate that other dielectric constants are envisioned. The substrate 204 may include a high dielectric constant material such as Panasonic Megtron 6 material. The layers in the substrate may be virtual or real. The substrate may have a depth (Z-axis) between 150 and 450 mils, for example, 260 mils. The substrate may be implemented as a printed circuit board (PCB). In some embodiments, the radome and the substrate may be integrated as a PCB.

A HOFS Integrated meander line polarizer radome including the radome and the substrate may have a depth of about 290 mil or greater. The substrate (PCB stack) may be integrated with the first substrate (radome) such that there is no air gap between the two. In some embodiments, the PCB stack and the radome are in direct contact. In some embodiments, an HOFS Integrated meander line polarizer radome may be disposed in a grid array, for example, a triangular grid array, an equilateral triangle grid array, a rectangular grid array. The array of HOFS Integrated meander line polarizer radomes may be implemented with the substrate or PCB stack. The substrate may include a number of printed circuit board layers; all printed circuit board layers may include a high dielectric constant material suitable for FR-4 or Megtron 6 manufacturing processes. The printed circuit board maybe balanced to reduce warping.

Figure 3B:
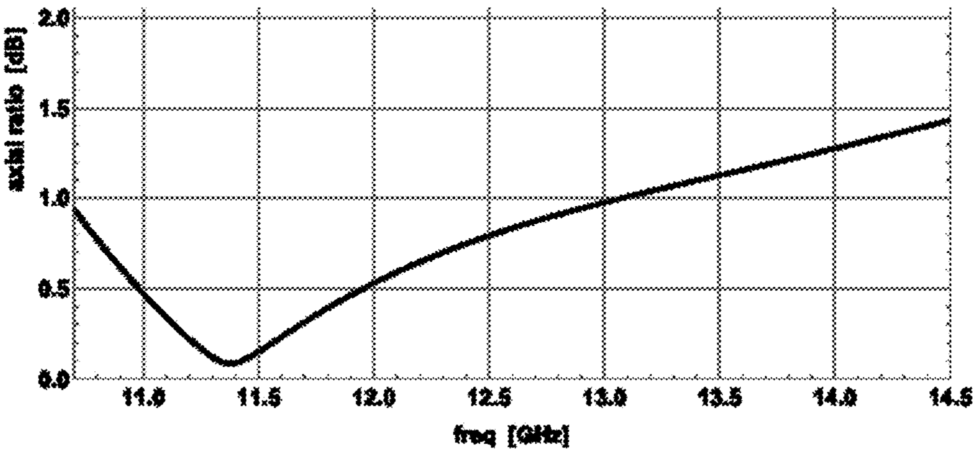
Figure 3C:
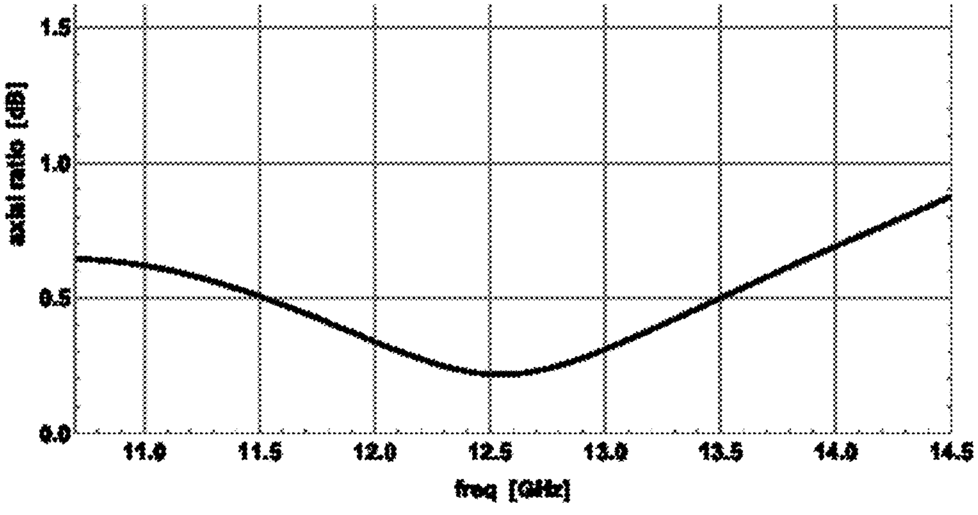
Figure 3D:
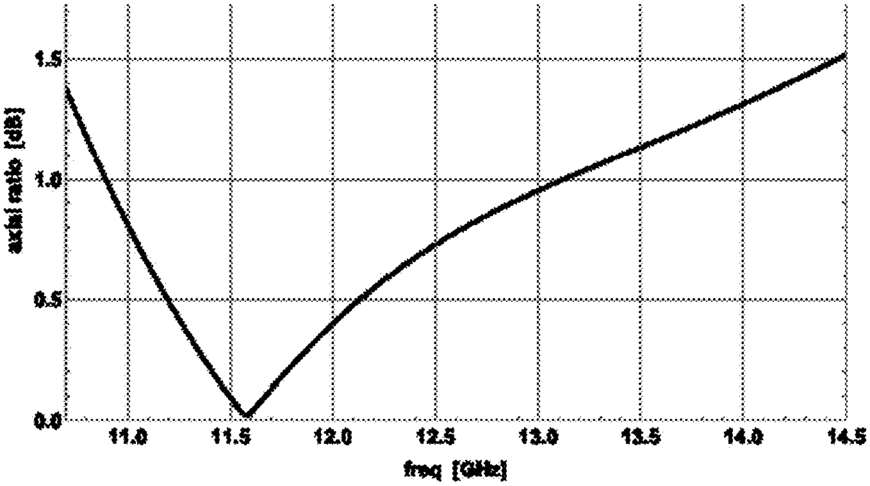
Figure 3E:
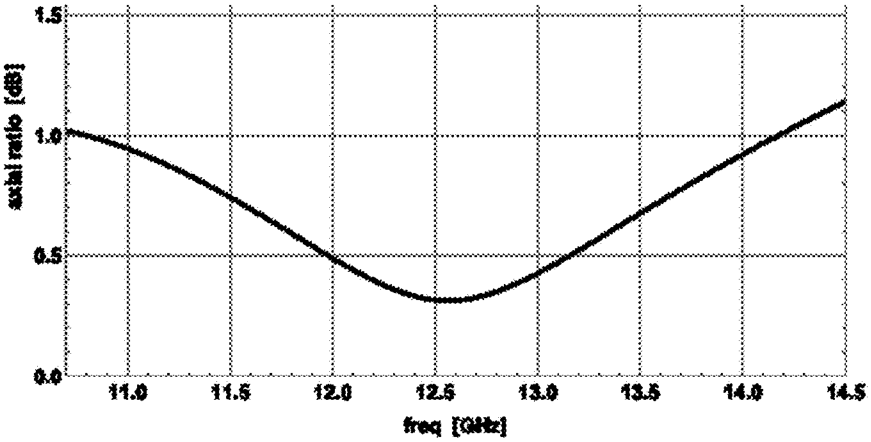

FIG. 3A illustrates a rectangular plot of the axial ratio of an integrated higher order Floquet mode meander line polarizer radome of the present teachings at theta=0, phi=0 scan. FIG. 3B illustrates a rectangular plot of the axial ratio of an integrated higher order Floquet mode meander line polarizer radome of the present teachings at theta=45, phi=0 scan. FIG. 3C illustrates a rectangular plot of the axial ratio of an integrated higher order Floquet mode meander line polarizer radome of the present teachings at theta=45, phi=90 scan. FIG. 3D illustrates a rectangular plot of the axial ratio of an integrated higher order Floquet mode meander line polarizer radome of the present teachings at theta=50, phi=0 scan. FIG. 3E illustrates a rectangular plot of the axial ratio of an integrated higher order Floquet mode meander line polarizer radome of the present teachings at theta=50, phi=90 scan. In FIG. 3A, FIG. 3B, FIG. 3C, FIG. 3D and FIG. 3E the calculated axial ratio meets the 2 dB axial ratio requirement with significant margin over a 10.7 to 14.5 GHz frequency band. The illustrated plots include an impact of the radome on the integrated higher order Floquet mode meander line polarizer radome.

Figure 4A:
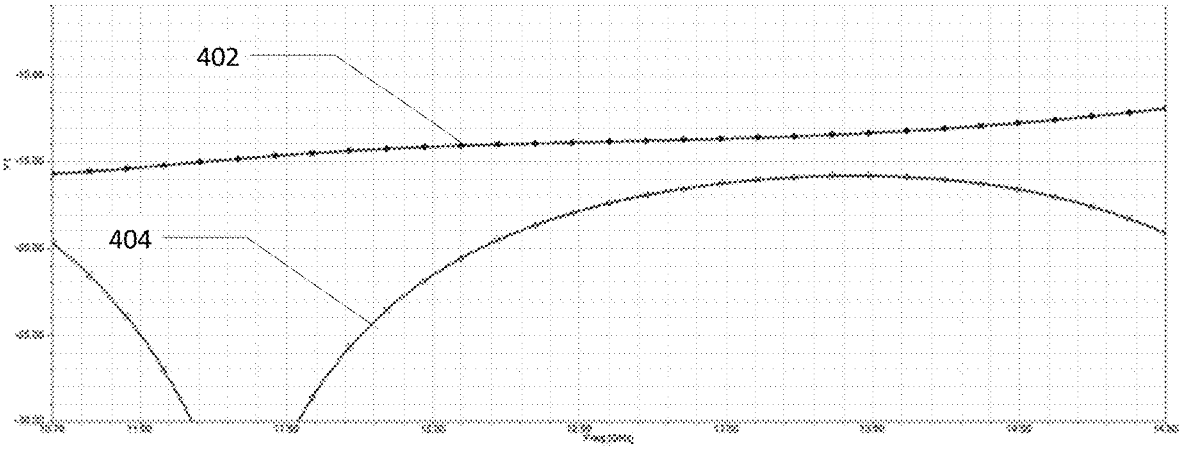
Figure 4B:
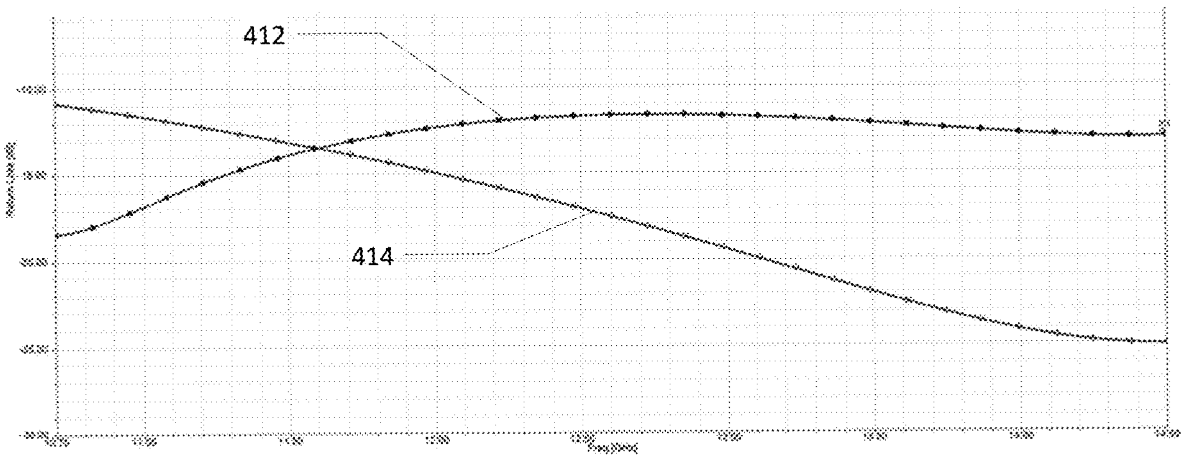
Figure 4C:
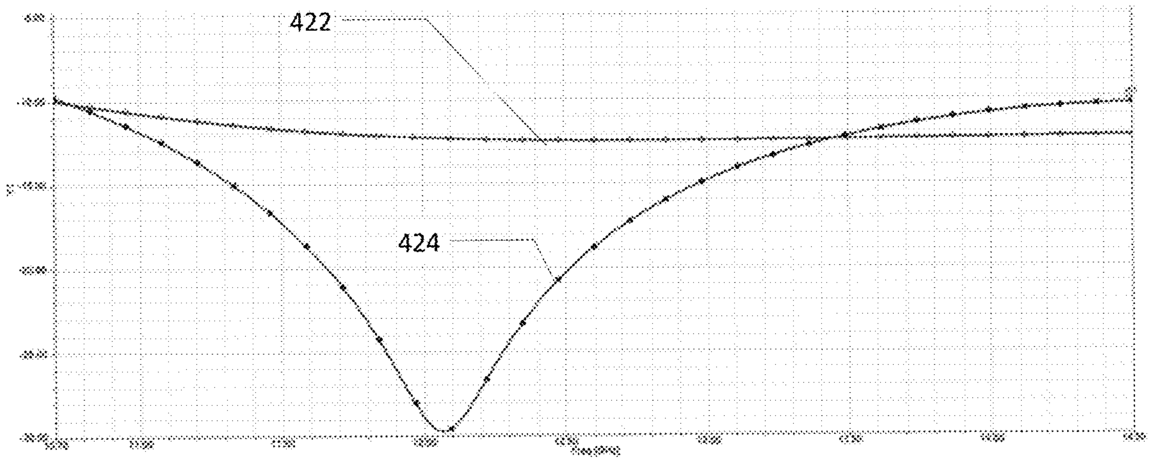
Figure 4D:
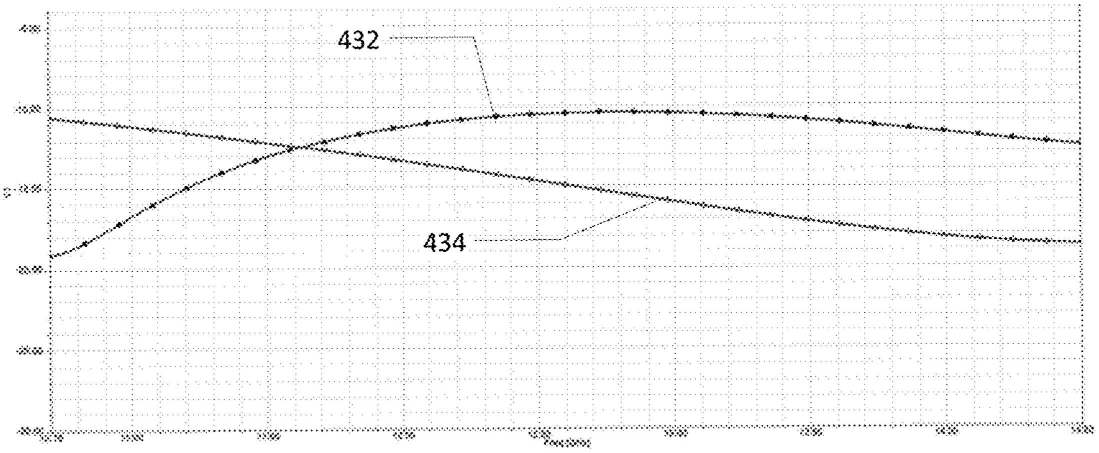
Figure 4E:
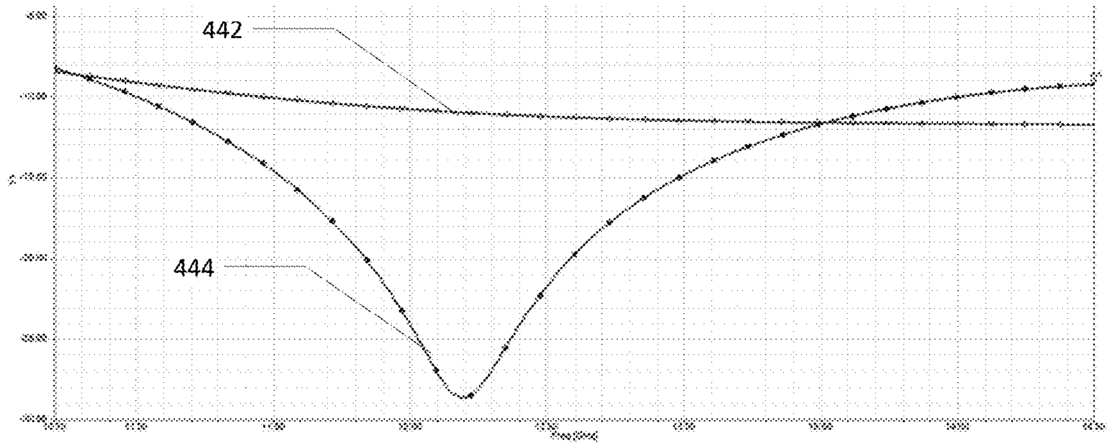

FIG. 4A illustrates a rectangular plot of the return loss of an integrated HOFS meander line polarizer radome of the present teachings at theta=0, phi=0 scan showing return loss for a horizontal polarization 402 and a vertical polarization 404. FIG. 4B illustrates a rectangular plot of the return loss of an integrated HOFS meander line polarizer radome of the present teachings at theta=45, phi=0 scan showing return loss for a horizontal polarization 412 and a vertical polarization 414. FIG. 4C illustrates a rectangular plot of the return loss of an integrated HOFS meander line polarizer radome of the present teachings at theta=45, phi=90 scan showing return loss for a horizontal polarization 422 and a vertical polarization 424. FIG. 4D illustrates a rectangular plot of the return loss of an integrated HOFS meander line polarizer radome of the present teachings at theta=50, phi=0 scan showing return loss for a horizontal polarization 432 and a vertical polarization 434. FIG. 4E illustrates a rectangular plot of the return loss of an integrated HOFS meander line polarizer radome of the present teachings at theta=50, phi=90 scan showing return loss for a horizontal polarization 442 and a vertical polarization 444. In FIG. 4A, FIG. 4B, FIG. 4C, FIG. 4D and FIG. 4E the measured return loss meets a return loss requirement with significant margin over a 10.7 to 14.5 GHz frequency band. The illustrated plots include an impact of the radome on the integrated HOFS meander line polarizer radome.

Figure 5A:
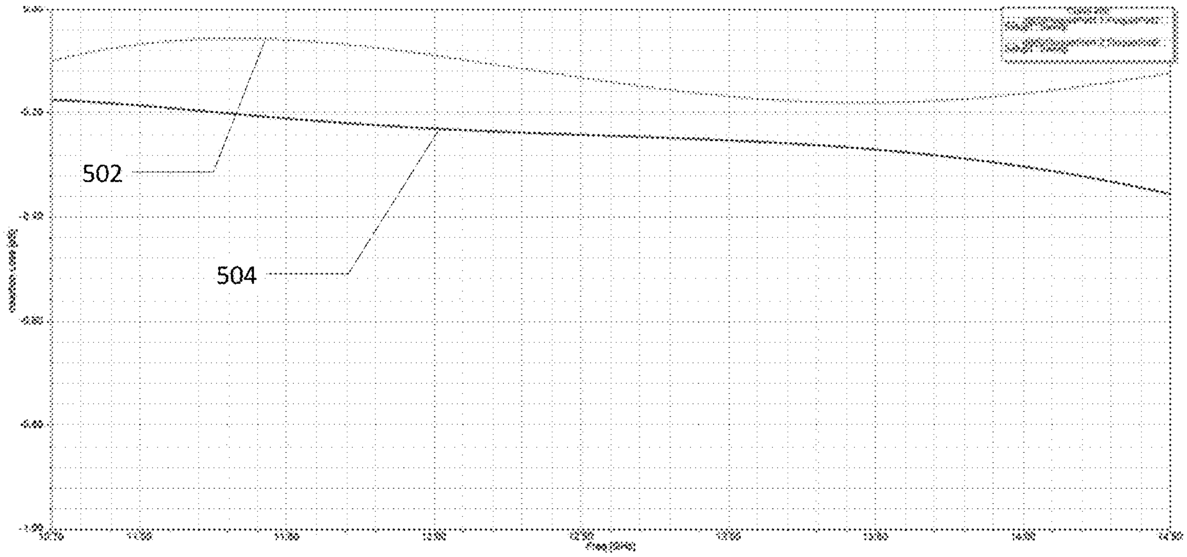
Figure 5B:
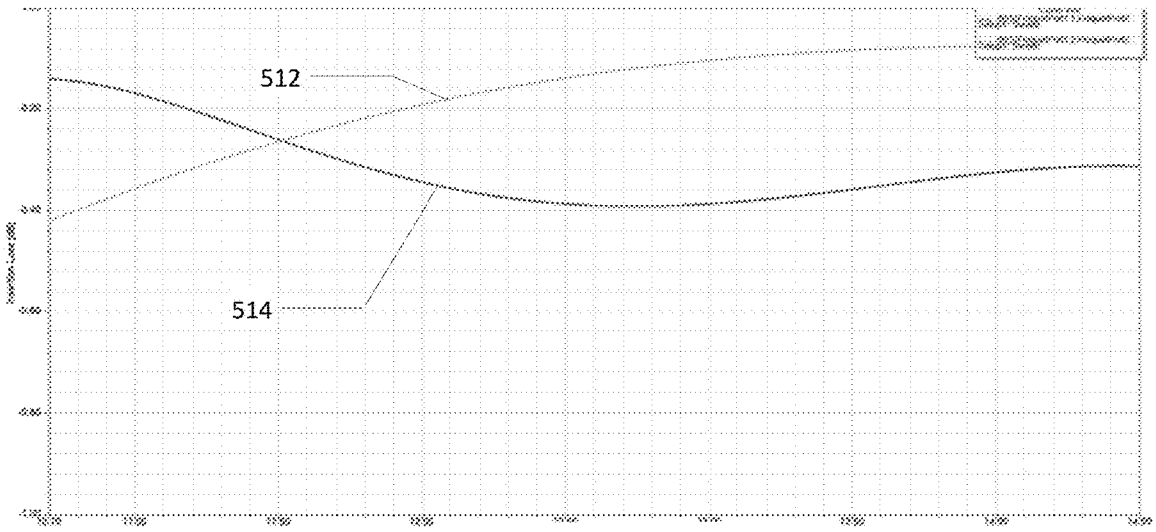
Figure 5C:
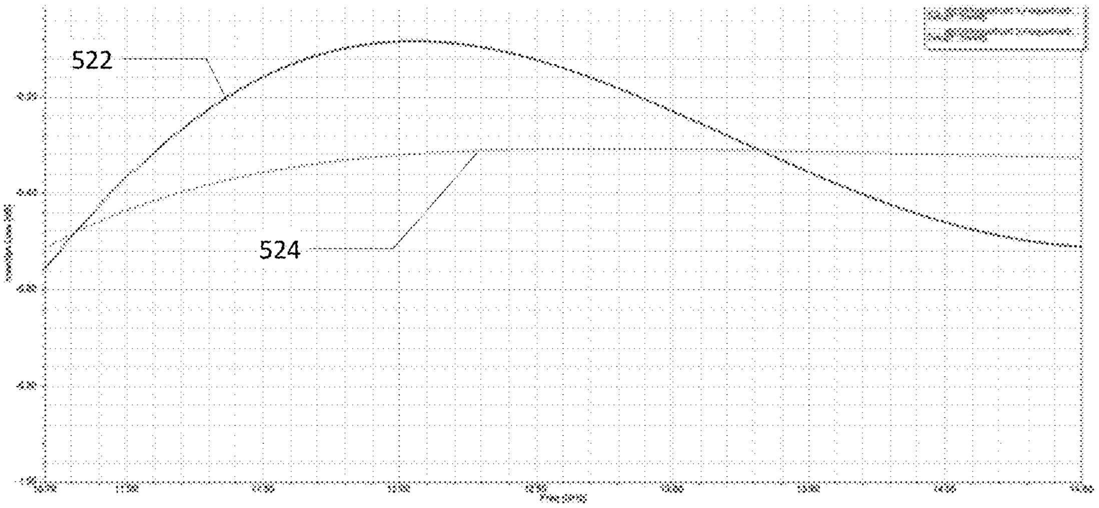
Figure 5D:
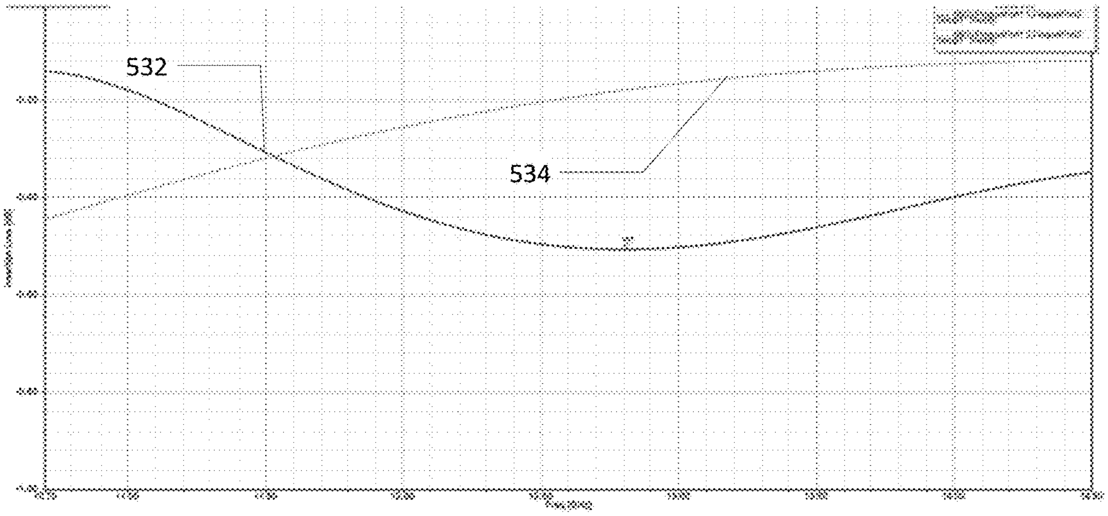
Figure 5E:
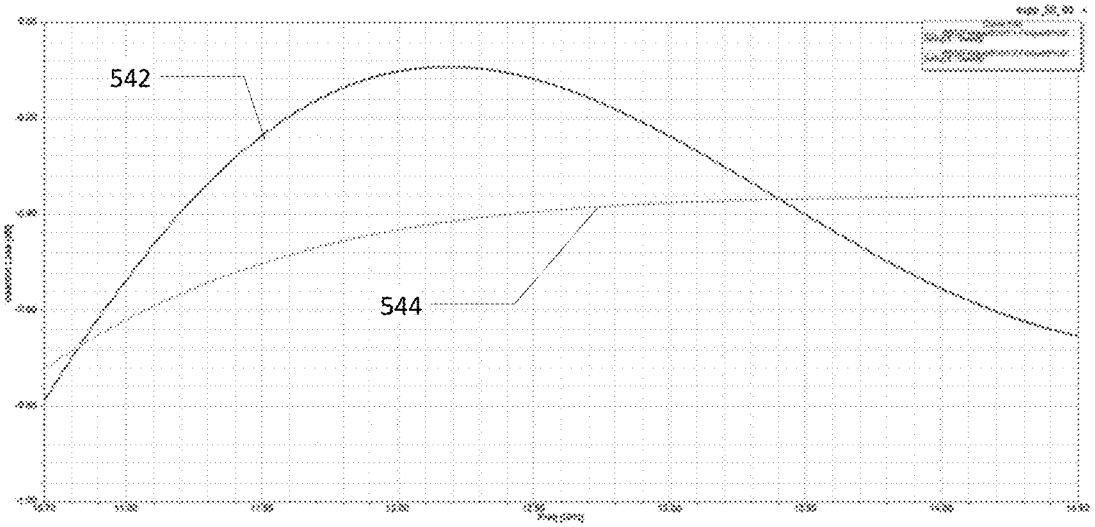

FIG. 5A illustrates a rectangular plot of the insertion loss of an integrated HOFS meander line polarizer radome of the present teachings at theta=0, phi=0 scan showing insertion loss for a horizontal polarization 502 and a vertical polarization 504. FIG. 5B illustrates a rectangular plot of the insertion loss of an integrated HOFS meander line polarizer radome of the present teachings at theta=45, phi=0 scan showing insertion loss for a horizontal polarization 512 and a vertical polarization 514. FIG. 5C illustrates a rectangular plot of the insertion loss of an integrated HOFS meander line polarizer radome of the present teachings at theta=45, phi=90 scan showing insertion loss for a horizontal polarization 522 and a vertical polarization 524. FIG. 5D illustrates a rectangular plot of the insertion loss of an integrated HOFS meander line polarizer radome of the present teachings at theta=50, phi=0 scan showing insertion loss for a horizontal polarization 432 and a vertical polarization 434. FIG. 5E illustrates a rectangular plot of the insertion loss of an integrated HOFS meander line polarizer radome of the present teachings at theta=50, phi=90 scan showing insertion loss for a horizontal polarization 442 and a vertical polarization 444. In FIG. 5A, FIG. 5B, FIG. 5C, FIG. 5D and FIG. 5E the measured insertion loss meets the insertion loss requirement with significant margin over a 10.7 to 14.5 GHz frequency band. The illustrated plots include an impact of the radome on the integrated higher order Floquet mode meander line polarizer radome.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. An integrated higher order Floquet mode structure (HOFS) meander line polarizer radome comprising: a substrate comprising layers having a dielectric constant (dk) greater than 2.0 and less than 5.0; a radome comprising an environmentally robust material, wherein there is no gap between the substrate and the radome; a HOFS comprising HOFS lines disposed in a first subset of the layers; and meander lines, to provide a phase shift and match, disposed in a second subset of the layers, wherein at least one layer of the first subset is disposed between the second subset of the layers, wherein the layers include a shared layer, and wherein the shared layer includes at least one of the HOFS lines and at least one of the meander lines.

2. The integrated HOFS meander line polarizer radome of claim 1, wherein at least one layer of the first subset is disposed above the second subset.

3. The integrated HOFS meander line polarizer radome of claim 1, wherein at least one layer of the first subset is disposed below the second subset.

4. The integrated HOFS meander line polarizer radome of claim 1, wherein at least one layer of the first subset is one of the layers of the second subset.

5. The integrated HOFS meander line polarizer radome of claim 1, wherein each of the meander lines comprises an electrical conductor having a width greater than or equal to 4 mils.

6. The integrated HOFS meander line polarizer radome of claim 1, wherein each of the meander lines is shaped as a rectangular wave and the meander lines are stacked above each other.

7. The integrated HOFS meander line polarizer radome of claim 1, wherein the HOFS lines comprise an electrical conductor having a width greater than or equal to 4 mils.

8. The integrated HOFS meander line polarizer radome of claim 1, wherein the layers comprise at least nine (9) layers.

9. The integrated HOFS meander line polarizer radome of claim 1, wherein the substrate has a cross-section depth between 150 and 450 mils.

10. The integrated HOFS meander line polarizer radome of claim 1, wherein the integrated HOFS meander line polarizer radome is configured to operate in a frequency range comprising 10.7 to 14.5 GHz.

11. The integrated HOFS meander line polarizer radome of claim 1, wherein the integrated HOFS meander line polarizer radome is configured to operate with a scan angle θ from 0° to 45° and a φ scan angle from 0° and 360°.

12. The integrated HOFS meander line polarizer radome of claim 1, wherein the radome comprises quartz having a thickness of at least 30 mils.

13. The integrated HOFS meander line polarizer radome of claim 1, further comprising an adhesive disposed between a surface of the radome and a surface of the substrate.

14. The integrated HOFS meander line polarizer radome of claim 1, wherein the radome together has a cross-section depth between 20 and 60 mils.

15. The integrated HOFS meander line polarizer radome of claim 1, wherein the dielectric constant of the radome is between 2.0 and 5.0.

16. The integrated HOFS meander line polarizer radome of claim 1, wherein the radome comprises quartz, at least one layer of the first subset is disposed above the second subset, at least one layer of the first subset is disposed below the second subset, at least one layer of the first subset is one of the layers of the second subset, the layers comprise at least nine (9) layers, the substrate has a cross-section depth between 150 and 450 mils, each of the meander lines comprises an electrical conductor having a width greater than or equal to 4 mils, each of the meander lines is shaped as a rectangular wave, and the meander lines are stacked above each other.

17. The integrated HOFS meander line polarizer radome of claim 1, wherein at least one layer of the first subset is disposed above the second subset, at least one layer of the first subset is disposed below the second subset, at least one layer of the first subset is one of the layers of the second subset, the layers comprise at least nine (9) layers, the substrate has a cross-section depth between 150 and 450 mils, each of the meander lines comprises an electrical conductor having a width greater than or equal to 4 mils, each of the meander lines is shaped as a rectangular wave, and the meander lines are stacked above each other.

18. The integrated HOFS meander line polarizer radome of claim 1, wherein the no gap between the substrate and the radome is maintained over the meander lines disposed in the second subset of the layers of the substrate.

* * * * *